United States Patent [19]

Peacock

[11] E Re. 29,016

[45] Reissued Oct. 26, 1976

[54] WELDING AND FORMING METHOD

[75] Inventor: George Raymond Peacock, Louisville, Ky.

[73] Assignee: Thermatool Corporation, Stamford, Conn.

[22] Filed: Feb. 13, 1975

[21] Appl. No.: 549,465

Related U.S. Patent Documents

Reissue of:

[64] Patent No.: 3,603,759
Issued: Sept. 7, 1971
Appl. No.: 4,173
Filed: Jan. 14, 1970

U.S. Applications:

[63] Continuation of Ser. No. 717,749, April 1, 1968, abandoned.

[52] U.S. Cl. ..... 219/9.5; 219/7.5; 219/10.41; 219/154

[51] Int. Cl.[2] ..... B23K 13/00

[58] Field of Search ..... 219/7.5, 6.5, 8.5, 9.5, 219/151–154, 149; 72/56

[56] References Cited

UNITED STATES PATENTS

| | | | |
|---|---|---|---|
| 2,137,909 | 11/1938 | Hagedorn | 219/91 X |
| 3,088,200 | 5/1963 | Birdsall et al. | 72/56 |
| 3,126,937 | 3/1964 | Brower et al. | 219/7.5 UX |
| 3,171,014 | 2/1965 | Ducati | 219/149 |
| 3,210,509 | 10/1965 | Alf | 219/7.5 |
| 3,251,974 | 5/1966 | Seyfried | 219/7.5 |
| 3,258,573 | 6/1966 | Morin et al. | 219/7.5 |

OTHER PUBLICATIONS

The Engineer's Manual, 2nd Edition, John Wiet & Sons, Inc., New York, p. 193.

*Primary Examiner*—Bruce A. Reynolds
*Attorney, Agent, or Firm*—Brooks Haidt Haffner & DeLaHunty

[57] ABSTRACT

A forming method in which members are forced together at an interface by causing parallel currents to flow in adjacent conductors, thereby forcing the conductors toward each other in a direction generally normal to the interface.

19 Claims, 1 Drawing Figure

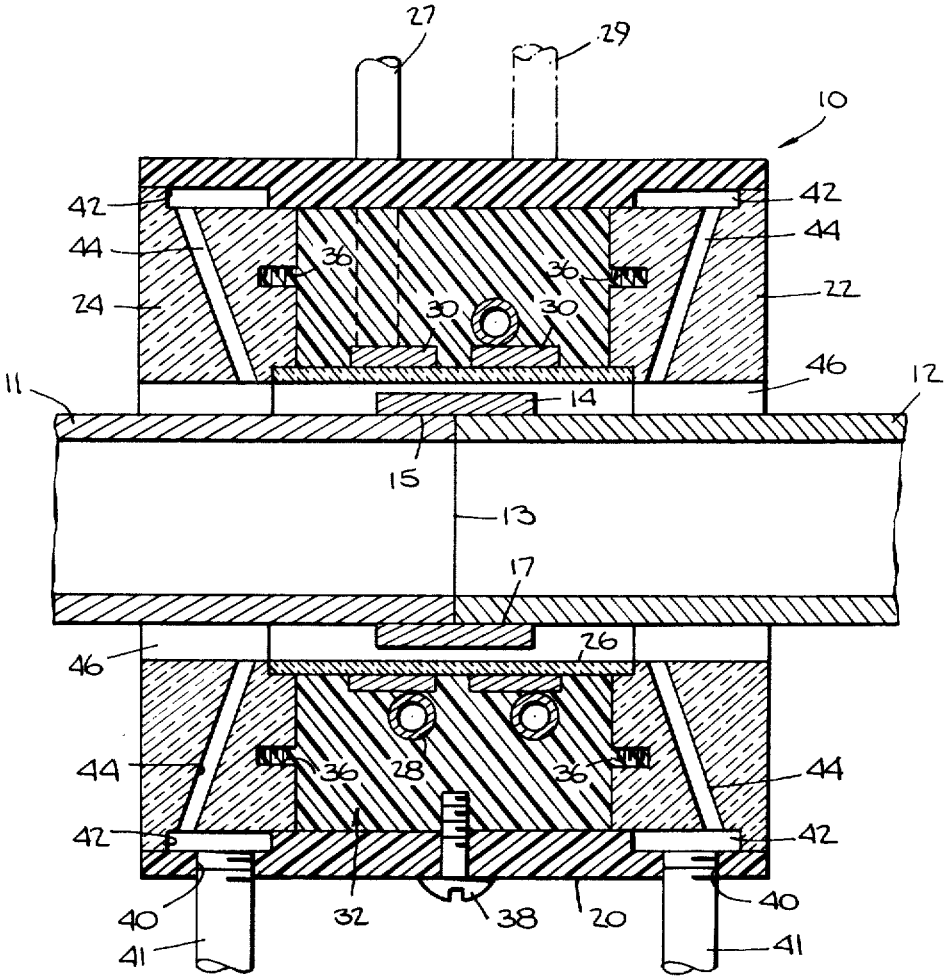
27
29
10
42
42
44
44
36
36
24
22
30
30
46
11
12
14
15
13
17
46
26
44
36
28
36
44
42
42
40
32
38
20
40
41
41

WELDING AND FORMING METHOD

Matter enclosed in heavy brackets [ ] appears in the original patent but forms no part of this reissue specification; matter printed in italics indicates the additions made by reissue.

This is a continuation of application Ser. No. 717,749, filed Apr. 1, 1968, now abandoned.

This invention relates to magnetic welding and forming.

It is a principal object of the present invention to weld members together using attractive magnetic forces. Other objects include butt or lap welding conductors with simple, reliable and inexpensive magnetic welding apparatus and eliminating the need for heavy reinforcement of the magnetic welding coil of such apparatus.

The invention features, in the method of welding members together at an interface therebetween, the steps of placing conductors adjacent each other and causing parallel (defined herein geometrically as parallel in direction and of the same sense) currents to flow in the conductors, thereby forcing the conductors together in a direction generally normal to the interface. In preferred embodiments in which the conductors may defined the interface there is featured placing a magnetic coil adjacent the conductors and inducing the parallel currents by passing a welding current through the coil, placing the conductors in electrical contact, heating the portions of the conductors defining the interface prior to welding, and inducing parallel currents having a skin depth of not less than the thickness of one of the conductors.

Other objects, features and advantages will appear from the following detailed description of a preferred embodiment of the invention, taken together with the attached drawing of apparatus for forming butt and lap welds between two pipes and a surrounding sleeve.

The illustrated apparatus for practicing the method of the present invention includes a magnetic coil assembly 10 comprising an outside sleeve 20 of poly (tetrafluoroethylene), (sold by the E. I. du Pont de Nemours & Co., Inc. under the name Teflon), and two end plates 22 and 24 and an inside sleeve 26 (1⅝ inches, o.d.; 1 7/16 i.d.) all made of the machinable ceramic aluminum silicon magnesium (sold by Minnesota Mining & Manufacturing Co. under the name of Al Sic Mag 222). A two-turn coil 28 of one-fourth inch copper refrigerator tubing is mounted within the annular, axially extending cavity defined by sleeves 20, 26 and end plates 22, 24. Each turn of coil 28 surrounds a split ring 30 made from 1½ inches SPS copper pipe. Rings 30 in turn surround inside sleeve 26. Cavity 32 is filled with an epoxy (Emerson Cumming #1210 Stycast Resin). The resin, in liquid form, is injected through a pouring hole (not shown) in one of the end plates 22, 24 and then allowed to harden. Four threaded holes 36 extend into the walls of end plates 22, 24 facing cavity 32 and are filled with the epoxy.

The end portions 27, 29 of the tubing forming coil 28 pass through holes in outside sleeve 20 for connection to source of water and electrical energy. The preferred electrical energy source is disclosed in [ the copending application of ] *U.S. Pat. No. 3,526,782 issued to* Peter D. Prevett and Theodore J. Morin entitled Conductive Solids Welding Circuitry [, filed in a common envelope herewith,] and assigned to [ Industrial Magnetics, Inc. ] *Thermatool Corp., the* assignee of the present application. The source there shown includes a high frequency motor generator, which is connected to coil 28 at appropriate times to provide inductive heating of the work piece comprising pipes 11, 12 and 14, and a capacitor bank, which is connected to the coil at appropriate times to provide a magnetic welding pressure pulse.

Two threaded argon supply holes 40 are provided in outside sleeve 20, each near one end of the sleeve overyling end plate 22 or 24, and communicate with annular cavities 42 formed by indentations in the outside sleeve and end plate. Four passages 44 in the end plates connect cavities 42 to the gap 46 between the apparatus and the workpiece, slanting axially inwardly as they approach the gap. A source of argon, not shown, may be connected to holes 40 via fittings 41.

FIG. 1 illustrates a workpiece including two three-fourth inch schedule 40 stainless steel pipes 11, 12, each having an o.d. of 1.050 inches and an i.d. of 0.864 inches, meeting end-to-end at an interface 13 and a sleeve 14 of 1 inch schedule 40 stainless steel pipe (o.d. 1.315 inches, i.d. 1.049 inches) surrounding the portions of pipes 11, 12 adjacent interface 13. The adjacent cylindrical surfaces of pipe 11 and sleeve 14, and pipe 12 and sleeve 14, respectively, define interfaces 15 and 17 therebetween. The i.d. of sleeve 14 and o.d. of pipes 11, 12 are such as to provide firm electrical contact between the three. The workpiece is mounted coaxially within coil assembly 10 with the combination lap and butt joint defined by interfaces 13, 15 and 17 centered within coil 28.

In welding pipes 11, 12, 14 together according to the portion of the present invention, the portions thereof adjacent interfaces 13, 15 and 17 were first inductively heated by passing a high frequency current through coil 28. This high frequency current was provided by a motor generator and a circuit such as that disclosed in assignee's other application, previously referred to. In welding the present workpiece, the motor generator was operated at a frequency of $10^4$ Hertz.

After the workpiece had been adequately heated, the motor generator was disconnected from coil 28 and the coil was connected to a charged capacitor bank. The capacitor bank was then discharged through coil 28 to induce circumferentially-flowing currents in pipes 11, 12 and sleeve 14. The rise time of the welding current pulse passed through coil 28 (defined as the required for the current to increase from 10 percent to 90 percent of its maximum value) was selected so that the skin depth of the induced current was 0.65 inch, or some 0.20 inch greater than the thickness of the overlapping portions of sleeve 14 and pipes 11, 12.

The exact characteristics of the welding current pulse and the induced currents depend on the inductance of the work coil circuit and the capacitance of the capacitor bank. In the disclosed apparatus, the resistance of the work coil circuit was sufficiently low that the welding current pulse had an underdamped oscillatory condition. The capacitor bank had a capacitance of 240 microfarads (480 joules at 2000 volts); the characteristic frequency of the circuit was 6000 Hertz.

The parallel induced currents in pipes 11, 12 and sleeve 14 create attractive forces between the pipes and sleeve. These forces draw the pipes axially together (in a direction perpendicular to interface 13) and draw the adjacent portions of the pipes and sleeve radially toward each other (in a direction normal to interfaces 15 and 17).

A second subcycle of heating and welding enhances the weld between the pipes and sleeve. In the preferred embodiment, a heating step of 30 seconds duration was followed by a welding pressure pulse, another 10 second heating step, and then a second welding pressure pulse.

During the inductive heating of the workpiece, argon gas was supplied to cavity 32 through passages 44 cooling the surface of the workpiece and maintaining the integrity of the work piece by preventing oxidation. The induced, heat-creating current flow is greatest at the surface of the workpiece and diminishes beneath surface. Cooling the surface produces a more uniform heat distribution throughout the interface-defining portions of workpiece than is otherwise obtainable.

During the welding process cooling water was supplied to the tube forming work coil 28 to prevent its temperature from rising too high.

What is claimed is:

1. A forming method in which [ members ] *electrical conductors* are forced together at an interface thereof, said method comprising the steps of:

placing *said* conductors in contact with each other *to provide said interface therebetween;* placing [ a magnetic ] *an induction* coil [ adjacent ] *and* said conductors *adjacent each other with said coil and said interface disposed relative to each other so that a current flowing in said coil will induce generally parallel currents in each of said conductors at said interface with the current in one of said conductors flowing in the same direction as the current flowing in the other of said conductors;*

*heating the portions of said conductors at said interface;* and passing [ a forming current ] through said coil *a forming current of characteristic frequency and magnitude sufficient* to [ induct ] *induce said generally parallel* currents in each of said conductors [ flowing generally parallel to each other and to ] *at* said interface *in a magnitude sufficient to force* [said currents induced by said forming current causing] *each of said conductors* [to be forced towards] *against* the other in a direction generally perpendicular to said interface *and to cause forming of at least one thereof.*

[2. The method of claim 1 including the step of electrically connecting said conductors prior to passing said forming current through said coil.]

[3. The method of claim 1 including the step of heating the portions of said members defining said interface prior to passing said forming current through said coil and wherein said forming current causes said members to be forced together.]

4. The method of claim [ 3 ] *1* wherein [ said conductors define said interface and ] said portions are inductively heated by passing [ a ] *an alternating* heating current through said coil *prior to passing said forming current through said coil.*

5. The method of claim 4 wherein said forming current causes said conductors to be welded together at said interface.

6. The method of claim 1 wherein [ said conductors define said interface and ] the skin depth of said currents induced by said forming current is not less than the thickness of one of said conductors.

7. The method of claim 1 wherein said conductors are cylindrical and define said interface and said coil surrounds the portions of said conductors defining said interface.

8. The method of claim 7 wherein at least one of said conductors is tubular and the skin depth of said currents induced by said forming current is not less than the wall thickness of said tubular conductor.

9. The method of claim 7 wherein said conductors are tubular, one of said conductors surrounds the other of said conductor thereby defining a generally cylindrical interface therebetween, and the skin depth of said currents induced by said forming current is [ not less ] *greater* than the [ total ] radial thickness of said [ conductors through said interface ] *one conductor.*

10. The method of claim 9 wherein the portions of said conductors defining said interface are inductively heated by passing an [inductive] *alternating* heating current through said coil prior to passing said forming current through said coil whereby said forming current causes said conductors to be welded together at said interface.

11. The method of claim 7 wherein said conductors are cylindrical and are placed end-to-end to define [ an ] *said* interface therebetween generally normal to the axes of said conductors.

12. The method of claim 1 wherein the portions of said conductors defining said interface are inductively heated by passing an [ inductive ] *alternating* heating current through said coil prior to passing said forming current through said coil whereby said forming current causes said conductors to be welded together at said interface.

13. The method of claim 1 [ including the steps of: placing a pair of cylindrical ] *wherein said* conductors *are cylindrical and are placed in* end-to-end *contact* to define [ a first ] *said* interface therebetween substantially normal to the axes of said conductors [; ] *and further comprising the steps of:* placing a conductive sleeve in *a* position surrounding the portions of said cylindrical conductors defining said [ first ] interface to define a second interface between said sleeve and one of said conductors and a third interface between said sleeve and the other of said conductors; *and* placing said [magnetic ] *induction* coil in *a* position adjacent and generally surrounding said interfaces [; ] whereby [ passing ] said forming current *passing* through said coil [ to induce ] *induces* currents in said conductors and said sleeve flowing generally parallel to each other and to said interfaces [; ] and [ said currents causing ] *causes* said conductors to be forced together in a generally axial direction and said conductors and said sleeve to be forced together in generally radial directions.

14. The method of claim 13 wherein the portions of said sleeve and said conductors defining said *second and third* interfaces are heated prior to passing said forming current through said coil.

15. The method of claim 14 wherein said portions are heated by passing an [ inductive ] *alternating* heating current through said coil.

16. The method of claim 13 wherein the skin depth of said currents induced by said forming current is [ not less ] *greater* than the radial thickness of said sleeve.

17. The method of claim 13 wherein said conductors are tubular and the skin depth of said currents induced by said forming current is not less than the total radial thickness of one of said conductors and said sleeve through the interface defined thereby.

18. The method of claim 17 wherein the portions of said conductors and said sleeve defining said *second and third* interfaces are heated prior to passing said forming current through said coil.

19. The method of claim 4 including the step of cooling surfaces of said conductors during the inductive heating thereof.

20. The method of claim 4 including the steps of *again* inductively heating said conductors and then *again* forcing said conductors [ together ] *against each other* by inducing parallel-flowing currents therein subsequent to the initial [ inductive ] heating and *initial* forcing together of said conductors.

*21. The method of claim 4 wherein said alternating current is a high frequency current.*

* * * * *

UNITED STATES PATENT AND TRADEMARK OFFICE

CERTIFICATE OF CORRECTION

PATENT NO. : RE. 29,016

DATED : October 26, 1976

INVENTOR(S) : George Raymond Peacock

It is certified that error appears in the above-identified patent and that said Letters Patent are hereby corrected as shown below:

Identifier [73]: "Corporation" should read --Corp.--

Col. 1, line 63: after "epoxy." insert --A locking screw 38 passes through outside sleeve 20 into the epoxy.--

Signed and Sealed this

Twenty-fifth Day of January 1977

[SEAL]

*Attest:*

RUTH C. MASON
*Attesting Officer*

C. MARSHALL DANN
*Commissioner of Patents and Trademarks*

Disclaimer

Reissue 29,016.—*George Raymond Peacock*, Louisville, Ky. WELDING AND FORMING METHOD. Patent dated Oct. 26, 1976. Disclaimer filed April 4, 1978, by the assignee, *Thermatool Corp.*

Hereby enters this disclaimer to claims 7 and 13 through 18 of said patent. [*Official Gazette June 6, 1978.*]